United States Patent
Patnala et al.

(10) Patent No.: US 9,771,044 B1
(45) Date of Patent: Sep. 26, 2017

(54) LEATHER TRIM PANEL SKIN HIDDEN TEAR SEAM WITH DISRUPTED FIBER MATRIX

(71) Applicant: FORD GLOBAL TECHNOLOGIES, LLC, Dearborn, MI (US)

(72) Inventors: Manoj Kumar Patnala, Canton, MI (US); Bari W. Brown, Ann Arbor, MI (US); Frank Q. Liu, Canton, MI (US); Alan M. Perelli, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/137,402

(22) Filed: Apr. 25, 2016

(51) Int. Cl.
*B60R 21/2165* (2011.01)
*B60R 21/205* (2011.01)
*B60R 21/217* (2011.01)

(52) U.S. Cl.
CPC ........ *B60R 21/2165* (2013.01); *B60R 21/205* (2013.01); *B60R 21/2176* (2013.01)

(58) Field of Classification Search
CPC .............. B60R 21/2165; B60R 21/205; B60R 21/2176
See application file for complete search history.

(56) References Cited

U.S. PATENT DOCUMENTS

| | | | |
|---|---|---|---|
| 1,122,245 A | 12/1914 | Bayard | |
| 6,337,461 B1* | 1/2002 | Yasuda | B23K 26/032 219/121.62 |
| 6,753,057 B1* | 6/2004 | Gardner, Jr. | B29C 37/0057 280/728.3 |
| 7,323,131 B2 | 1/2008 | Lutz et al. | |
| 7,497,463 B2 | 3/2009 | Kaulbersch et al. | |
| 7,631,890 B1* | 12/2009 | Kalisz | B29C 45/0081 280/728.3 |
| 8,132,307 B2 | 3/2012 | Aichner et al. | |
| 8,651,514 B2* | 2/2014 | Zhang | B60R 21/2165 156/160 |
| 8,807,590 B2 | 8/2014 | Wisniewski et al. | |
| 8,870,217 B2* | 10/2014 | Kim | B29C 45/1671 280/728.3 |
| 2002/0050046 A1* | 5/2002 | Nicholas | B29C 59/007 29/428 |
| 2004/0061262 A1 | 4/2004 | Cowelchuk | |
| 2004/0164531 A1* | 8/2004 | Riha | B29C 59/16 280/732 |

(Continued)

*Primary Examiner* — Drew J Brown
(74) *Attorney, Agent, or Firm* — Vichit Chea; MacMillan, Sobanski & Todd, LLC

(57) ABSTRACT

A vehicle interior trim system such as an instrument panel or a door panel includes a panel substrate defining a deployment aperture. An inflatable device such as an air bag is adapted to deploy through the aperture during a crash. A natural, tanned leather skin covers the substrate, wherein the skin has a tear seam corresponding to the aperture on a hidden surface of the skin. An aperture door may be fitted within the deployment aperture which is adapted to open against the skin in response to deployment of the inflatable device. The tear seam is comprised of a region on the hidden surface of the skin having a disrupted fiber matrix from exposure to an alkaline solution such as ammonia, bleach, sodium tetraborate, sodium hydroxide, sodium bicarbonate, trisodium phosphate, potassium hydroxide, and potassium carbonate.

19 Claims, 5 Drawing Sheets

(56) References Cited

U.S. PATENT DOCUMENTS

2004/0207181 A1 10/2004 Hayashi et al.
2006/0226638 A1 10/2006 Yasuda et al.
2015/0028570 A1 1/2015 Jacobs et al.

* cited by examiner

LEATHER TRIM PANEL SKIN HIDDEN TEAR SEAM WITH DISRUPTED FIBER MATRIX

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to leather skin covered interior trim components for vehicles, and, more specifically, to pre-weakening of a tear seam in a leather cover skin without mechanical cutting or removal of leather material at the seam.

Passenger vehicles often provide airbag assemblies that deploy through interior trim panels such as an instrument panel, door panel, door pillars, seats, and roof liners. During an impact condition, the airbag is deployed for cushioning an occupant thereby enhancing safety. One typical instrument panel includes a rectangular opening having one or more hinged doors within the opening. The hinged doors are arranged to pivot from the instrument panel as an airbag deploys, forcing the doors outward. Such an instrument panel may include a rigid substrate, a layer of foam, and a layer of skin. The foam layer is typically injected between the substrate and the skin layer. Upon opening of the door(s), it is necessary that the skin and foam layers tear away in order to permit opening of the door(s) and passage of the air bag emerging from behind the panel. To assist in tearing, a pre-weakened tear seam is typically provided in the skin and foam layers.

For styling purposes, it is desirable for the air bag deployment door and the pre-weakened tear seam to be invisible when viewed from the passenger compartment. In other words, the visible or "Class A" surface of the instrument panel is preferably seamless. Therefore, the pre-weakened tear seam is formed on a hidden surface of the skin (on the "Class B" side), preferably in a manner that leaves the unhidden Class A surface undistorted.

The most commonly used materials for making panel cover skins for passenger vehicles have been various polymers including urethane. The skins have been molded or cast and then mechanically scored along a tear seam. Mechanical scoring includes cutting (i.e., scribing) into a surface with a knife blade (which can be cold or heated or vibrated ultrasonically) or with a laser. It is also know to remove material by chemical means. In some instances, scoring is conducted simultaneously for the substrate, foam layer, and skin layer by scanning with a laser.

In luxury vehicles, it is more common to utilize a natural leather to provide the skin layer. Leather skin can be provided with a foam layer or can be hard wrapped without a foam layer. Due to the properties of leather (such as variability in the skin thickness), creation of a tear seam which remains invisible on the Class A surface is more difficult. In particular, removal of material or direct mechanical cutting into the surface has a risk of "read-thru" at the visible side. Examples of mechanical alteration of the leather skin from the hidden surface include U.S. Pat. No. 8,132,307 and U.S. Pat. No. 7,497,463. It would be desirable to improve tear seam performance and to provide associated manufacturing techniques that maintain low cost and reliable results.

SUMMARY OF THE INVENTION

In one aspect of the invention, a vehicle system comprises a substrate forming an interior trim panel and defining a deployment aperture. An inflatable device is adapted to deploy through the aperture. A leather skin covers the substrate, wherein the skin has a tear seam corresponding to the aperture on a hidden surface of the skin. A door may be fitted within the deployment aperture which is adapted to open against the skin in response to deployment of the inflatable device. The tear seam is comprised of a region on the hidden surface of the skin having a disrupted fiber matrix from exposure to an alkaline solution such as ammonia, bleach, sodium tetraborate, sodium hydroxide, sodium bicarbonate, trisodium phosphate, potassium hydroxide, and potassium carbonate.

DETAILED DESCRIPTION OF PREFERRED EMBODIMENTS

Figure 1:
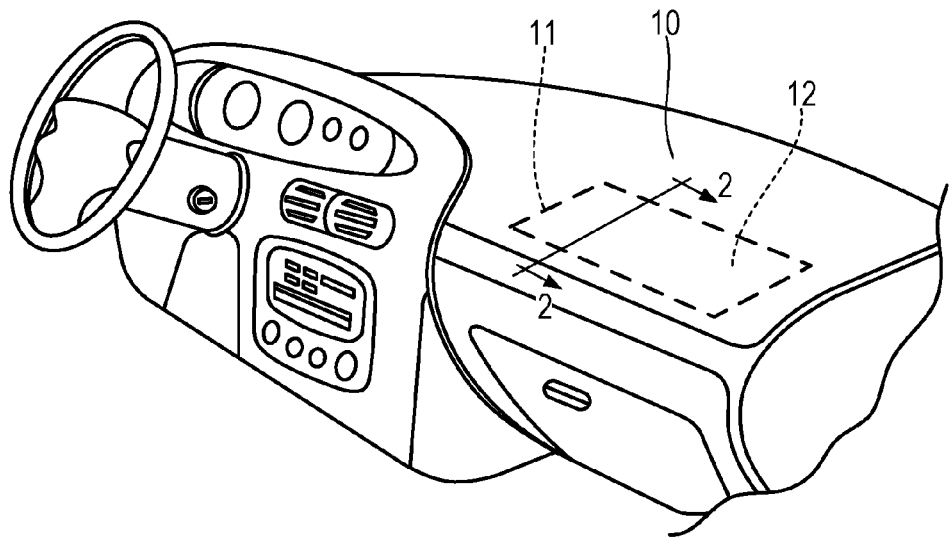
FIG. 1 is a perspective view of an automotive instrument panel system showing a passenger air bag deployment area.
Figure 2:
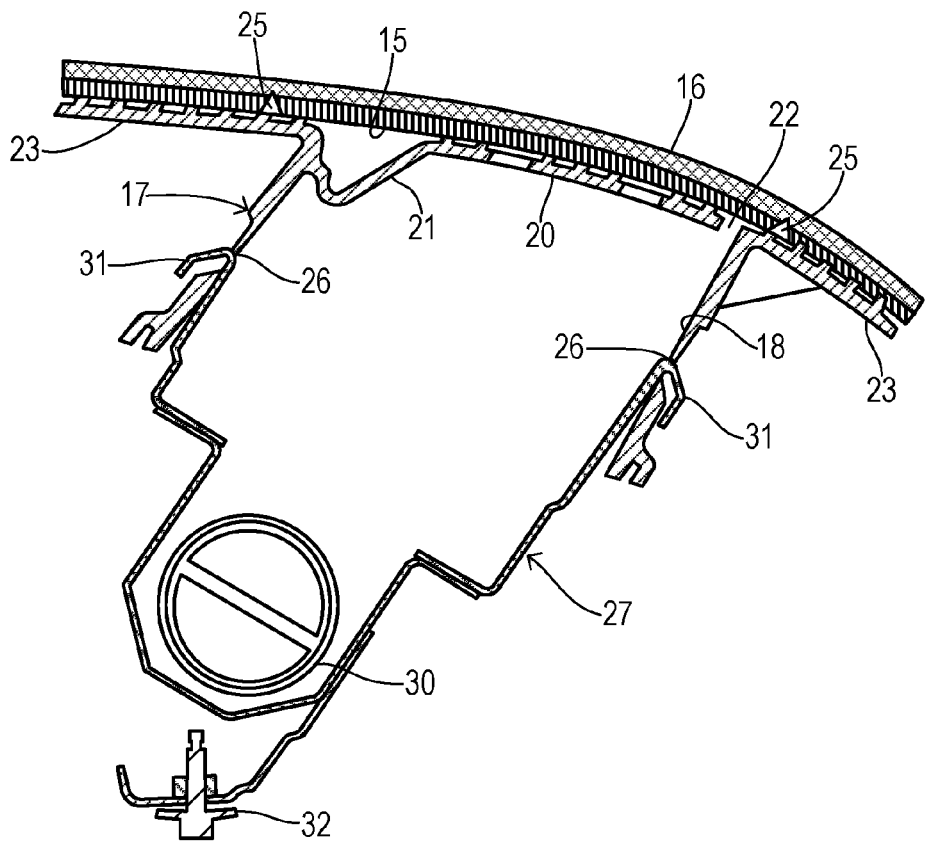
FIG. 2 is a cross-sectional view along line 2-2 of FIG. 1 showing a passenger air bag system.

Referring now to FIG. 1, an instrument panel 10 includes a passenger air bag system with a hidden seam 11 defining a deployment door area 12. FIG. 2 depicts one type of prior art air bag system in a view taken along line 2-2 of FIG. 1. An instrument panel substrate 15 provides the desired shape and rigidity for the instrument panel. It is overlaid by a cover layer 16 which may include a skin and a layer of foam between the skin and substrate 15. A chute 17 includes a tubular passageway 18 and a deployment door 20 at the upper end thereof. Deployment door 20 is coupled to passageway 18 by a hinge 21 along one side. A gap 22 may define an outer edge on three sides of door 20, for example. Instead of a gap, a pre-weakened seam may be employed. Chute 17 includes a flange 23 surrounding door 20. Flange 23 and door 20 may have a plurality of ribs for welding chute 17 to instrument panel substrate 15.

Instrument panel substrate 15 defines a deployment aperture through which an air bag can deploy as a passive restraint to protect a vehicle occupant during a crash event. The deployment aperture can be an open area in substrate 15, but is more typically defined by a hidden seam 25 passing through substrate 15 along a door perimeter (breakable bridges of unremoved substrate material between the door and the substrate may be left in place are various points around the door perimeter to provide support for the structure prior to an air bag deployment). Hidden seam 25 typically extends through both substrate 15 and covering layer 16. Seam 25 has typically been formed by mechanical or laser scoring prior to attachment of chute 17. An air bag module 27 is mounted to a plurality of holes 26 in chute passageway 18. Air bag module 27 is comprised of a rigid box containing a propellant source 30 and a folded bag (not shown) that is guided via passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket.

Figure 3:
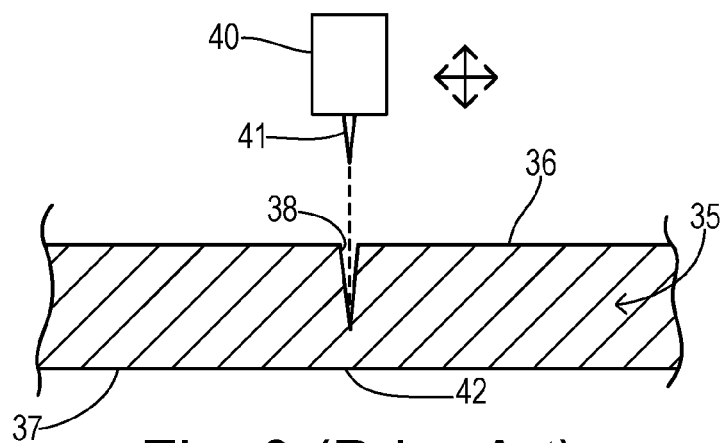
FIG. 3 is a cross-sectional view of formation of a tear seam in a leather trim panel cover skin using mechanical alteration of the leather.

In the case of a leather cover skin for an interior trim panel having a hidden pre-weakened tear seam, the conventional seam has been formed by mechanical cutting and/or removal of a portion of the leather material from the hidden surface as shown in FIG. 3. Thus, a leather cover skin 35 has a hidden Class B surface 36 and a visible Class A surface 37. A seam 38 the penetrates hidden surface 36 may be created by a mechanical cutter 40 being drawn over the surface 36 according to a desired pattern, for example. Cutter 40 may include a sharp pin, knife blade, or other mechanical cutting element for introducing a slit or microperforations as known in the art. It is also known to remove material using a skiving blade or a laser beam, for example. The mechanical alteration of leather cover skin 35 sufficient to ensure proper tearing may create a risk of read-through wherein the presence of the tear seam is visible at area 42 on visible surface 37.

The production of leather for use in a cover skin involves various steps such as tanning which result in the leather being acidic, having a pH typically between about 4.5 and 5.0. Finished leather gets its thickness and strength from a fiber network layer in the form of a matrix of collagen fibrils that originate in the dermis of the original animal hide. The strength and stability of leather material is dependent upon achieving the appropriate acidity in the finished product.

Figure 4:
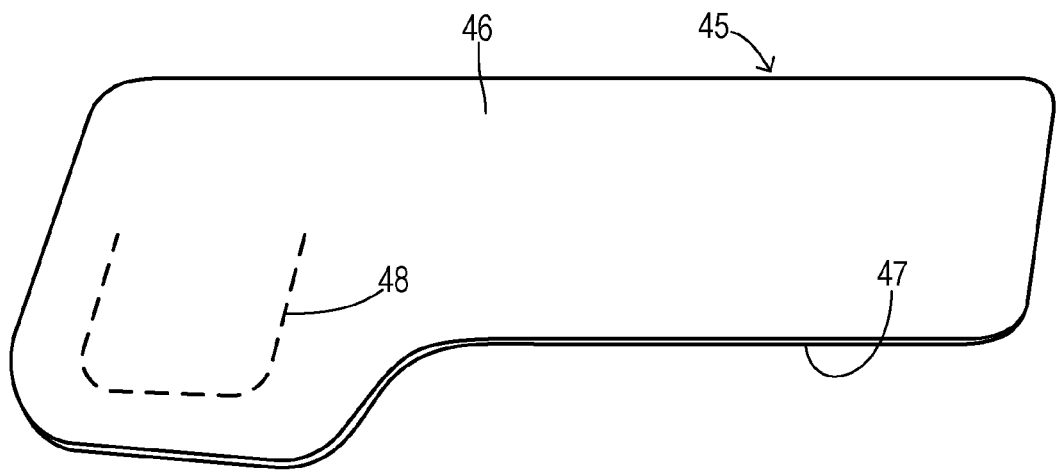
FIG. 4 is a perspective view of a leather skin into which a U-shaped tear seam is introduced using an alkaline solution of the present invention.
Figure 5:
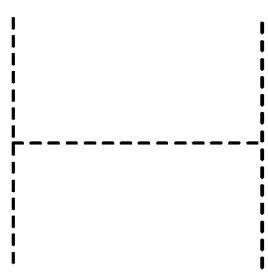
FIGS. 5-8 a plan views showing alternative patterns for a tear seam.
Figure 6:
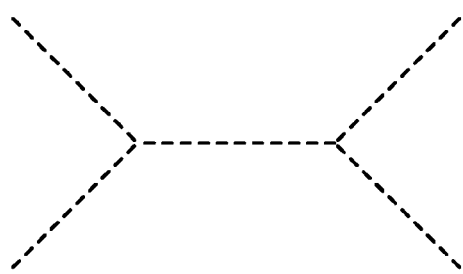
Figure 7:
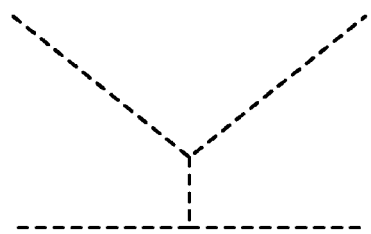
Figure 8:
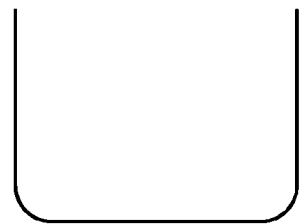

In the present invention, a selective application of an alkaline solution to disrupt the fiber matrix in particular regions on the hidden surface of the leather skin is used to create the desired tear seam. As shown in FIG. 4, a leather skin 45 has a hidden surface 46 and a visible surface 47. To help define an airbag deployment opening, a tear seam 48 is formed in hidden surface 46 having a placement corresponding to a deployment aperture in a trim panel substrate, wherein the tear seam has an overall U-shaped pattern and is comprised of a dashed pattern selected to achieve a desired tearability while maintaining sufficient integrity to ensure that tear seam 48 remains invisible from visible side 47. As known in the art, additional tear seam patterns can be employed such as an H-pattern in FIG. 5, a bowtie pattern in FIG. 6, a Y-shaped pattern in FIG. 7, and a continuous (i.e., non-dashed) U-shaped pattern in FIG. 8.

Exposure of a desired region of the leather skin to an alkaline solution disrupts the fiber matrix without removing any material at the tear seam. Instead, the disrupted fiber matrix at the tear seam has a reduced strength, mainly as a result of becoming brittle.

Figure 9:
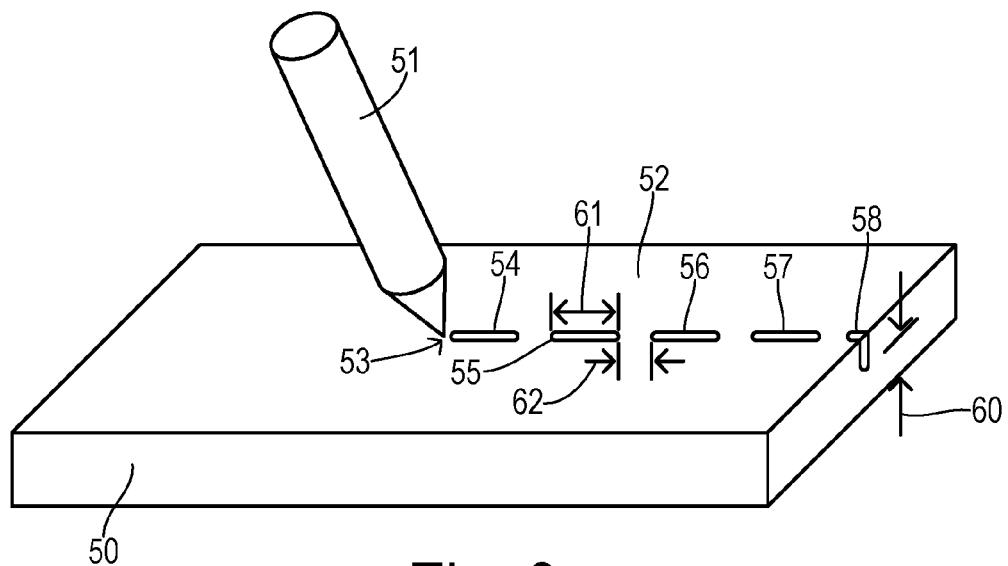
FIG. 9 is a perspective view showing application of an alkaline solution to disrupt a fiber matrix on a hidden side of the leather skin to pre-weaken the skin along a tear seam.
Figure 10:
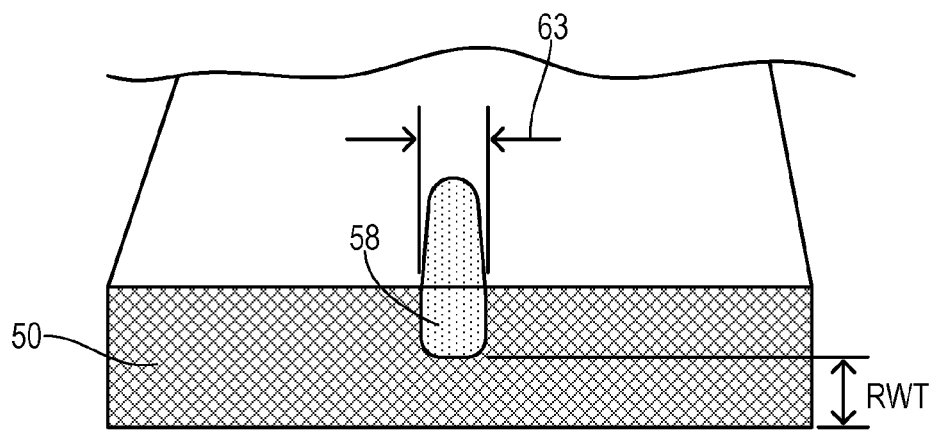
FIG. 10 is a cross section showing the disrupted fiber matrix in greater detail.

A preferred technique for introducing an alkaline solution to the hidden surface of a leather skin is shown in FIG. 9. A leather cover skin 50 receives metered doses of an alkaline solution from a nozzle 51 as it proceeds over a hidden surface 52 of leather skin 50 following a pattern selected for a tear seam 53. Thus, an appropriate amount of alkaline solution is deposited along regions 54-58. To strike the desired balance between weakening along tear seam 53 and sufficient strength to maintain structural integrity at the visible surface of leather skin 50 to avoid readthrough, the metering of alkaline solution is configured to occur at a rate selected to penetrate hidden surface 52 by a desired depth. The partial penetration leaves a remaining wall thickness (RWT) 60. In the dashed pattern of FIG. 9, each dash has a desired weakening link 61 with adjacent dashes being separated by a spacing 62. As shown in FIG. 10, each region in the tear seam also has a strip with 63. In a preferred embodiment, RWT 60 has a thickness in a range from about 0.2 to about 0.6 mm. Strip width 63 is less than or equal to 12 mm, and most preferably is in a range of about 2 to about 4 mm.

Preferably, the alkaline solution has a pH in a range from about 8 to about 12. Almost any basic (i.e., caustic) substance can be used. For example, the alkaline solution may preferably comprise at least one of ammonia, bleach, sodium tetraborate, sodium hydroxide, sodium bicarbonate, trisodium phosphate, potassium hydroxide, and potassium carbonate in an aqueous solution. Preferably, the alkaline solution is metered at a rate less than or equal to 36 $mm^3$ per 10 mm length, and most preferably at a rate in a range of 4 $mm^3$ to 8 $mm^3$ per 10 mm length.

Figure 11:
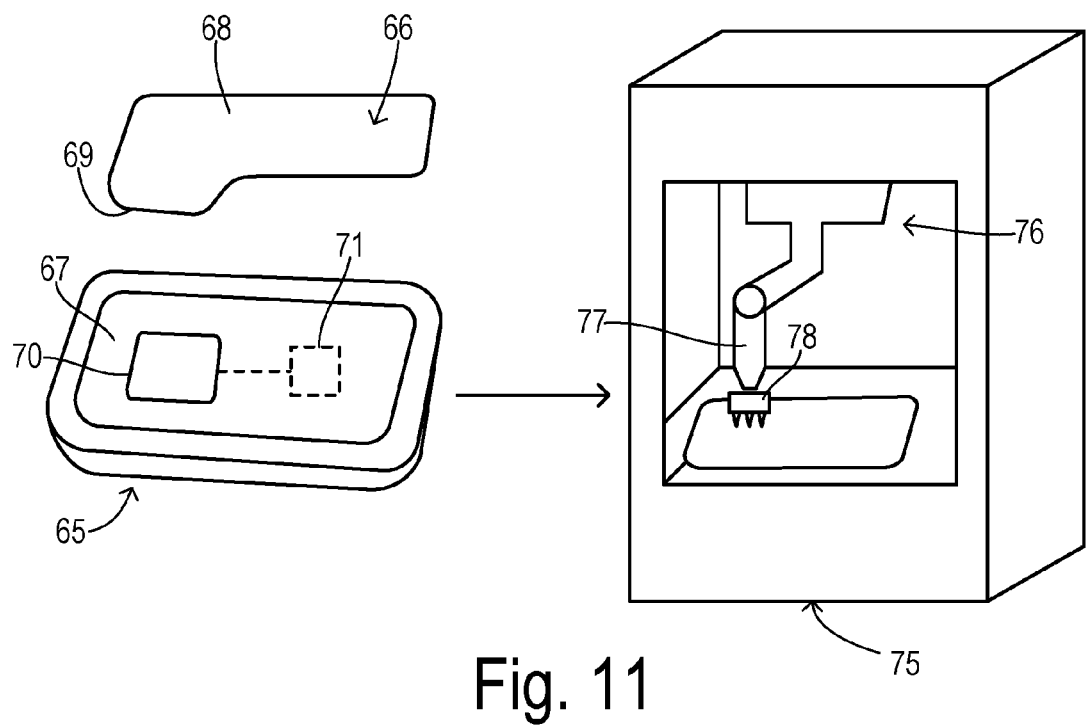
FIG. 11 is a diagram showing manufacturing equipment for introducing the tear seam of the present invention.

FIG. 11 shows a preferred manufacturing system wherein a shuttle 65 is provided for registering (i.e., aligning) a leather cover skin 66 on a top generally horizontal surface 67. For the application of an alkaline solution, leather skin 66 is placed at a reference position in a horizontal orientation with its hidden surface 68 facing upward. Thus, an unhidden Class A surface 69 faces downward and is in contact with shuttle surface 67 which includes a chemical sensor system 70 connected to a control circuit 71. Shuttle 65 is useful for both handling of skin 66 during processing and monitoring for the occurrence of any defects detected by sensors 70 which result when alkaline solution fully penetrates leather skin 66.

Figure 12:
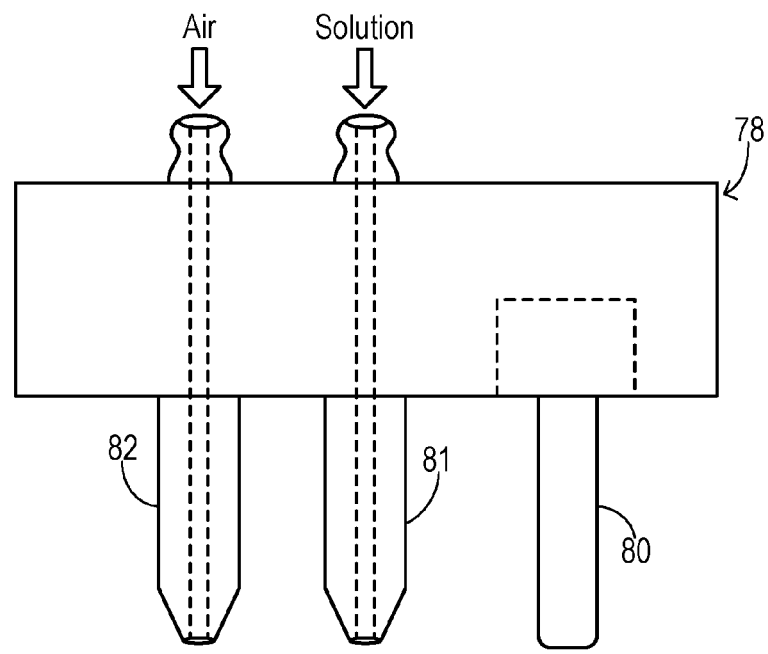
FIG. 12 is a plan view of a carriage for a robotic applicator of the invention.

After registering leather skin 66 on shuttle 65, shuttle 65 is loaded onto a conveyor for moving skin 66 into processing booth 75. Booth 75 houses a robotic applicator system 76. After shuttle 65 has transported skin 66 into booth 75, robotic applicator system 76 activates various movable nozzles for delivering a metered alkaline solution and a drying air jet, for example. Robotic applicator system 76 includes a robotic arm 77 which supports a multiple-nozzle carriage 78. The nozzles are scanned along a predetermined track on hidden surface 68. As shown in FIG. 12, carriage 78 may preferably include a routing head 80, a liquid applicator nozzle 81, and an air jet nozzle 82. Robotic applicator 76 is programmed to scan carriage 78 in a manner that sequentially meters the alkaline solution at a predetermined rate along the predetermined track of the tear seam followed by a drying or wait time. During the drying/wait time, the fiber matrix of the leather skin becomes locally disrupted to a predetermined depth along the predetermined track in order to define a tear seam having the desired properties.

Due to use of caustic materials, booth 75 is preferably a closed system for providing a protected environment. After an operator registers a leather skin using fixture attachments on the shuttle, the shuttle presents the leather to the robotic applicator. Based on the particular trim panel design, an appropriate alkaline solution and tear seam pattern are identified by a controller (not shown) of the robotic applicator system. Known robotic actuators and a known type of control system can be used to provide a selected alkaline solution through nozzle 81 and a drying air supply through nozzle 82. Routing head 80 is used to properly position carriage 78 during scanning.

Figure 13:
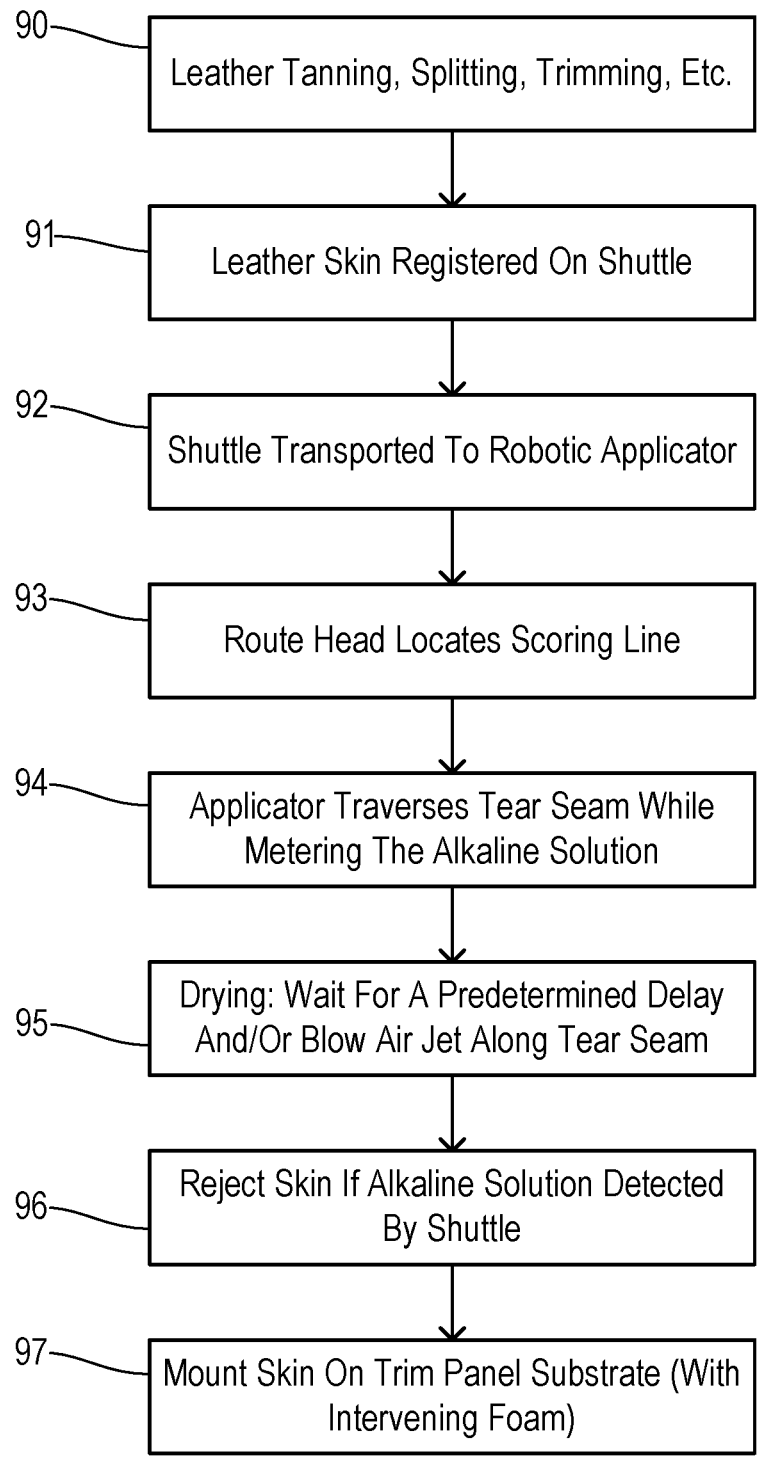
FIG. 13 is a flowchart of one embodiment of a method of the invention.

A preferred method is shown in greater detail in FIG. 13. In step 90, a leather skin is prepared from a source animal hide using known techniques such as tanning, splitting, trip trimming, and other conventional actions to prepare a cover skin adapted for use on an interior trim panel and ready for formation of a tear seam. In step 91, the leather skin is registered on the shuttle horizontal surface. The shuttle is transported to the robotic applicator in step 92. The route head of the robotic applicator locates a desired scoring line position in step 93. In step 94, the applicator traverses the tear seam while metering the chosen alkaline solution at a predetermined rate.

In step 95, drying of the skin is performed. The drying step comprises a delay having a duration adapted to enable the alkaline solution to partially penetrate the leather skin. The delay provides a reaction time necessary for the alkaline solution to disrupt the fiber matrix. With proper metering, the full amount of the caustic substance in the alkaline solution may be completely consumed. Optionally, the drying step may further include blowing an air jet along the tear seam to assist in removal of any remaining water. During processing, chemical sensors on the shuttle monitor for the appearance of any alkaline solution at the front surface of the leather skin. A skin is rejected in step 96 if alkaline solution is detected by the shuttle. If not rejected, the resulting leather skin with hidden tear seam can then be mounted on a trim panel substrate in step 97 as known in the art. For example, the leather skin may be mounted to a substrate with an intervening foam being injected between the skin and substrate.

What is claimed is:

1. A vehicle system comprising:
   a substrate forming an interior trim panel and defining a deployment aperture;
   an inflatable device adapted to deploy through the aperture; and
   a leather skin covering the substrate, wherein the skin has a tear seam corresponding to the aperture on a hidden surface of the skin, and wherein the tear seam is comprised of a region of the skin having a disrupted fiber matrix from exposure to an alkaline solution.

2. The system of claim 1 wherein a door is fitted within the deployment aperture adapted to open against the skin in response to deployment of the inflatable device.

3. The system of claim 1 wherein the tear seam partially penetrates the skin so that a visible surface of the skin adjacent the tear seam has a fiber matrix that is undisrupted.

4. The system of claim 3 wherein the undisrupted fiber matrix adjacent the tear seam provides a remaining wall thickness in a range of 0.2 to 0.6 mm.

5. The system of claim 1 wherein the tear seam has a strip width at the hidden surface less than or equal to 12 mm.

6. The system of claim 1 wherein the tear seam has a strip width at the hidden surface in a range of 2 to 4 mm.

7. The system of claim 1 wherein the tear seam is comprised of a dashed pattern.

8. A method of pre-weakening a tear seam on a leather cover skin for an automotive interior trim panel system, comprising the steps of:
   registering a leather cover skin in a substantially horizontal orientation with a hidden surface facing upward;
   metering an alkaline solution at a predetermined rate along a predetermined track on the hidden surface to react with the skin, thereby locally disrupting a fiber matrix of the skin to a predetermined depth to define a tear seam; and
   drying the skin.

9. The method of claim 8 wherein the alkaline solution has a pH in a range from 8 to 12.

10. The method of claim 9 wherein the alkaline solution is comprised of at least one of ammonia, bleach, sodium tetraborate, sodium hydroxide, sodium bicarbonate, trisodium phosphate, potassium hydroxide, and potassium carbonate.

11. The method of claim 8 wherein the alkaline solution is metered at a rate less than or equal to 36 $mm^3$ per 10 mm length.

12. The method of claim 8 wherein the alkaline solution is metered at a rate in a range of 4 $mm^3$ to 8 $mm^3$ per 10 mm length.

13. The method of claim 8 wherein the alkaline solution is metered to provide a track width of less than or equal to 12 mm.

14. The method of claim 8 wherein the alkaline solution is metered to provide a track width in a range from 2 mm to 4 mm.

15. The method of claim 8 wherein the drying step includes a delay adapted to provide a reaction time to allow the alkaline solution to partially penetrate the skin so that a visible surface of the skin adjacent the tear seam has a fiber matrix that is undisrupted.

16. The method of claim 8 wherein the drying step includes blowing air along the predetermined track.

17. The method of claim 8 wherein the registering step is comprised of placing the skin on a shuttle that transports the skin to a robotic applicator, and wherein the robotic applicator includes movable nozzles for delivering the metered alkaline solution and an air jet.

18. The method of claim 17 wherein the shuttle includes a chemical sensor for contacting an unhidden surface of the skin for detecting unintended penetration of the alkaline solution through the skin.

19. The method of claim 8 further comprising the step of:
   mounting the skin on an interior trim panel with the hidden surface contacting the panel, wherein the panel defines a deployment aperture with a door adapted to open in response to an inflatable device deployed during a crash event, and wherein the skin is mounted with the tear seam aligned with the door.

* * * * *